United States Patent [19]
Felderman et al.

[11] Patent Number: 5,335,350
[45] Date of Patent: Aug. 2, 1994

[54] INDIVIDUAL COMMUNICATION SYSTEM SELECTION METHOD FOR GROUP SERVICES

[75] Inventors: William A. Felderman; Daniel J. McDonald, both of Cary; Laura A. Christensen, Mt. Prospect, all of Ill.

[73] Assignee: Motorola, Inc., Schaumburg, Ill.

[21] Appl. No.: 841,674

[22] Filed: Feb. 26, 1992

[51] Int. Cl.[5] ............................................. H04B 7/14
[52] U.S. Cl. ..................................... 455/17; 455/34.1; 455/54.2; 455/68
[58] Field of Search ................................. 455/14–15, 455/17, 33.1, 34.1, 34.2, 51.1, 53.1, 68, 54.2, 56.1; 379/58

[56] References Cited

U.S. PATENT DOCUMENTS

| | | | |
|---|---|---|---|
| 4,817,190 | 3/1989 | Comroe et al. | 455/17 |
| 4,972,460 | 11/1990 | Sasuta | 455/17 |
| 5,014,345 | 5/1991 | Comroe et al. | 455/68 |
| 5,025,254 | 6/1991 | Hess | 455/34.1 |
| 5,117,501 | 5/1992 | Childress et al. | 455/34.1 |

*Primary Examiner*—Edward F. Urban
*Assistant Examiner*—Andrew Faile
*Attorney, Agent, or Firm*—Timothy W. Markison

[57] ABSTRACT

In a communication system network, an operator station, for a particular communication group, may select communication systems wherein a communication group service will be performed for the particular communication group. This is accomplished when the operator station selects, for the particular communication group, the group service to be performed and which communication systems the service is to be performed in. Once these parameters are selected, the operator station transmits them to the central controller which determines whether at least one communication unit of the particular communication group is registered in the selected communication systems. When at least one communication unit of the particular communication group is registered in the selected communication systems, the central controller allocates a communication resource in the selected communication system to the operator when a communication resource is available such that the selected communication group service can be performed.

12 Claims, 2 Drawing Sheets

INDIVIDUAL COMMUNICATION SYSTEM SELECTION METHOD FOR GROUP SERVICES

FIELD OF THE INVENTION

This invention relates generally to communication system networks and in particular to a method that allows an operator station to individually select communication systems for communication group services.

BACKGROUND OF THE INVENTION

Communication system networks are known to comprise a plurality of communication systems and a central controller. Each of the communication systems comprises a plurality of communication units, a limited number of communication resources that are transceived via a limited number of repeaters, and a communication resource allocator that allocates the communication resources among the plurality of communication units. The communication units, which may be mobile radios, portable radios, and/or portable radio/telephones, are typically arranged in to communication groups and are generally located throughout the communication system network. Of the communication resources, which may be TDM slot locations, frequency carriers, pair of frequency carriers, or any other RF transmission means, one is selected to function as a control channel. The control channel transceives operational information between the communication units and the central controller via the communication resource allocators.

As is known, a communication unit may establish a communication with other communication units within the communication system network by transmitting an inbound signalling word (ISW) to the central controller via the communication resource allocator of the communication system that the communication unit is located in. Upon receiving the request, the central controller processes it and, if the request is valid, the central controller allocates a communication resource in each of the communication systems that have a communication unit of the targeted talk group in it. The communication systems, which may also be communication sites, are coupled to and controlled by the central controller. If a communication system, or site, loses contact with the central controller, the communication system, or site, operates as an independent communication system but only for communication units that are located within its coverage area.

In addition to the above, a communication system network may further comprise operator stations, or consoles. An operator station allows a dispatcher, for example, to monitor the activity of particular communication groups. The operator may be allowed to select which communication groups its monitoring or that may be predetermined by a system manager. In the case where the operator station allows the operator to select which communication groups that it will monitor, the selection of group services is performed over the entire network. Thus, for example, when the dispatcher desires to place a call to a particular communication group to respond to an emergency, the central controller would allocate a communication resource in each of the communication systems for that particular call. This is inefficient when the particular system service to be performed is generally geared for a localized area. For example, the group service may be an emergency call wherein police units within a two or three mile radius of where the emergency is occurring would physically be able to respond and yet with present systems, communication units throughout the entire network would hear the emergency even though they may be up to 20 or 30 miles away.

In addition to emergency conditions, group services may also include status updates, general communications and other known services that communication system networks provide. Therefore, a need exists for a method that allows an operator of an operator station to individually select which communication sites, or systems, the operator desires to perform the selected group service in.

Summary of the Invention

These needs and others are substantially met by the individual communication systems selection method for group services disclosed herein. In a network of communication systems that comprises a plurality of communication systems, a central controller that interfaces with the plurality of communication systems and at least one operator station, wherein each communication system includes a plurality of communication units that are arranged into communication groups, a limited number of communication resources that are transceived via a limited number of repeaters, and a communication resource allocator that allocates via the central controller the limited number of communication resources among the plurality of communication unit, the following discloses a method that allows the operator station to individually select communication systems for communication group services. The process begins when the operator station selects, for a particular communication group, a communication group service for that particular group and selecting at least one communication system. These selections are then transmitted to the central controller which in turn determines whether at least one communication unit of the particular group is registered in the selected communication system. When at least one communication unit of the particular communication group is registered in the selected communication system, the central controller assigns a communication resource in the selected communication system to the operator station when a communication resource is available in a selected communication system.

DESCRIPTION OF A PREFERRED EMBODIMENT

Figure 1:
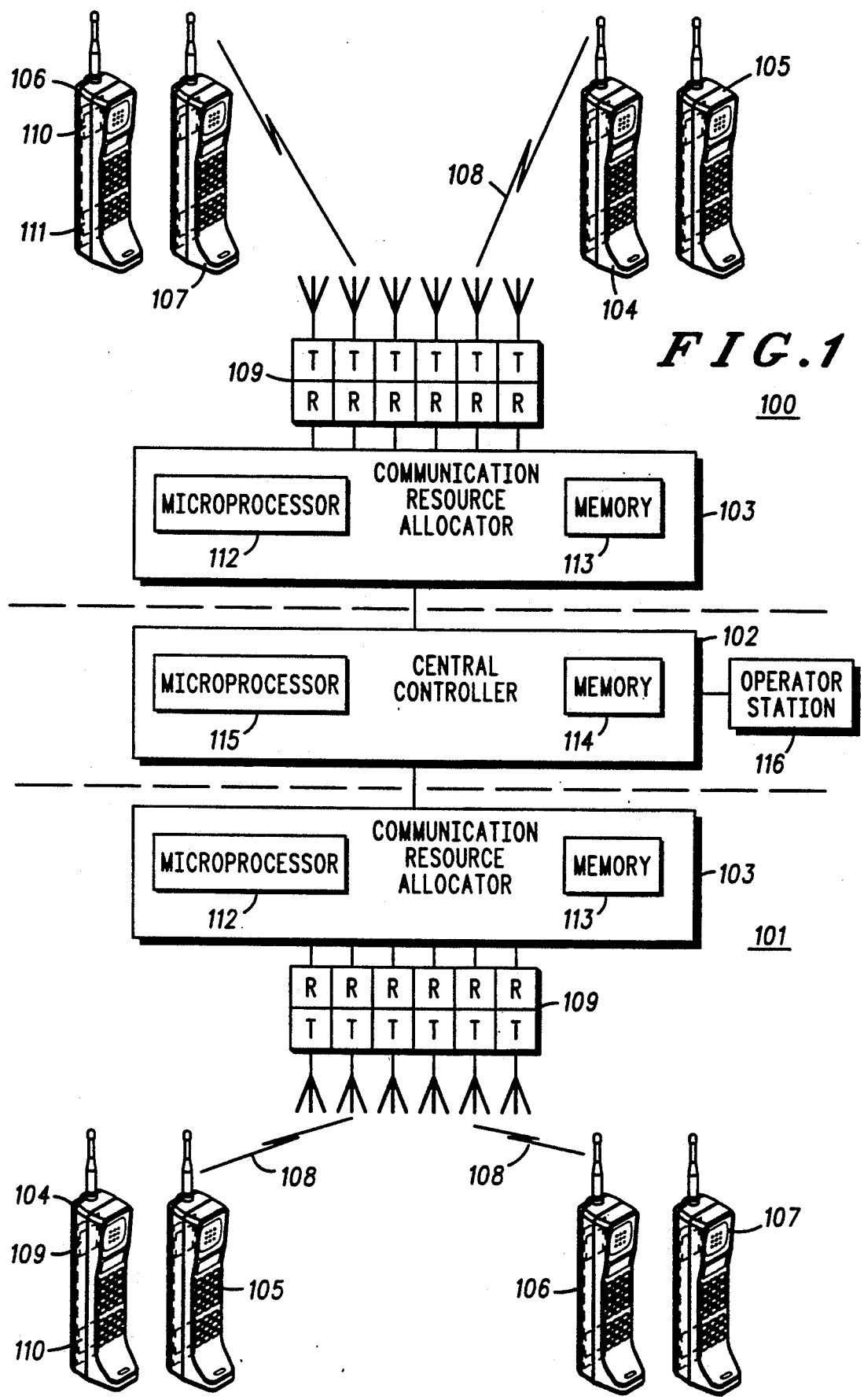
FIG. 1 illustrates a communication system network that may incorporate the present invention.

FIG. 1 illustrates a trunked communication system network that comprises a plurality of communication systems 100, 101 (only two shown), a central controller 102, and a plurality of operator stations 116 (only one shown). Each of the communication systems, which may also be communication sites, comprises a communication resource allocator 103, a limited number of communication resources 108, a number of repeaters, or base stations, 109, and a plurality of communication units 104–107. The operator station, 116 which may be a Motorola Centracom Series II console, comprises group regrouping selection mechanisms as is known in the art. The central controller 102, which may be a Motorola Smart Zone controller, comprises a microprocessor 112, which may be a Motorola 68040 microprocessor, and digital memory 113, which may be RAM, ROM, or any other type of means for storing digital information. Each communication resource allocator 103, which may be a Motorola remote central site controller, comprises a microprocessor 115, which may be a Motorola 6809 microprocessor, and digital memory 113, which may be RAM, ROM, or any type of means for storing digital information. Each of the communication units 104–107, which may be a Motorola STX, comprises a microprocessor 110, which may be a Motorola 68HC11 microprocessor, and digital memory 111, which may be RAM, ROM, or any other type of means for storing digital information. The communication resources 108 are transceived between the communication units 104–107 and the communication resource allocator 103 via the repeaters 109, and wherein one of the communication resources is selected as a control channel.

A general procedure for dispatching to a selected set of communication systems is as follows. The operator of the operator station determines that he wishes to communicate with a selected set of communication systems for a particular communication group. The operator selects a set of communication systems for the particular communication group and transmits this request to the central controller. The central controller determines which of the set of selected communications systems contain at least one communication unit in the particular communication group. When at least one communication unit of the particular communication group is registered in a selected communication system, the central controller will assign, on a per communication system basis, a communication resource in each of the communication systems that contain a communication unit in the particular communication group to the operator station such that a group communication service can be performed. The central controller will transmit to the operator station a service performance message indicating up to three items: the selected communications systems that the particular communication group service is performed in; the selected communication systems that did not contain at least one communication unit of the particular communication group registered in it; and the communication systems that were not selected that contained at least one communication unit of the particular communication group.

Furthermore, if none of the selected set of communication systems contained at least one communication unit of the particular communication registered in it, the central controller would transmit to the operator station a rejection message indicating that there are no communication units of the particular communication group in the selected set of communication systems. The central controller would also transmit, to the operator station, a message indicating the communication systems that contained at least one communication unit of the particular communication group registered in it. This would give the operator the information needed to select systems, or sites, that had at least one communication unit in the particular communication group registered in it.

An example of the dispatching to a selected set of communication systems is as follows. The dispatcher of a trunked communication system may be in charge of a group of police officers. If an emergency situation was occurring on the south side of a town, the dispatcher would only want to talk with those officers located near the scene of the emergency. Therefore, the operator would select the communication systems located near the emergency situation and transmit a request to the central controller with the selected communication systems and the particular communication group, in this case the police officers group. The central controller would then assign, for the operator, the selected communication systems that contained at least one communication unit in the particular communication group. The operator would then begin a communication service with the particular communication group at the selected communication systems.

Figure 2:
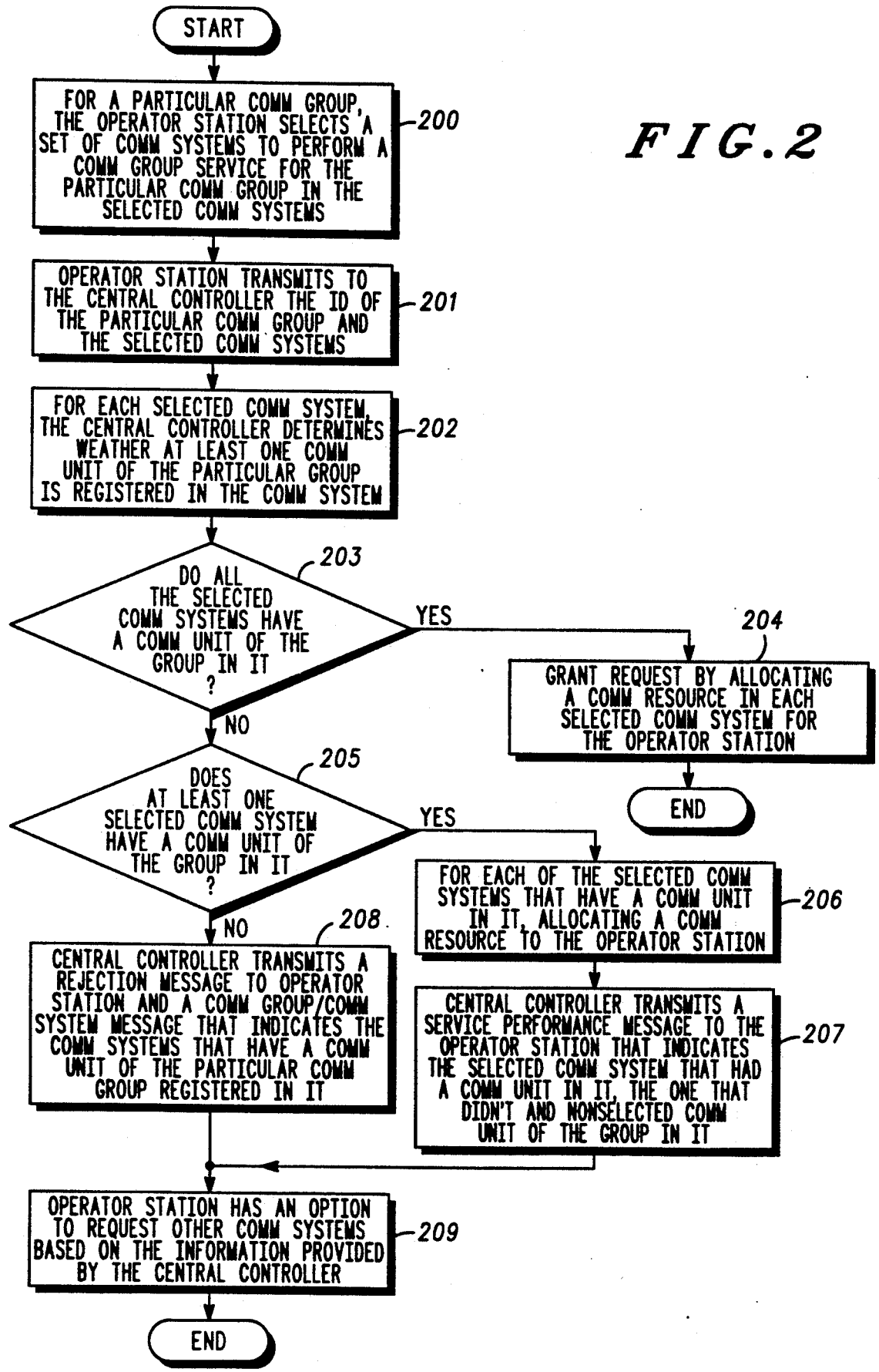
FIG. 2 illustrates a logic diagram that may be used to implement the present invention.

The method of FIG. 2 can be employed in a system that allocates resources to communication systems based on a selection made from an operator station. The respective portions of the algorithm are programmed into a microprocessor of the central controller, the communication resource allocator and the operator station. At step 200, the operator of the operator station selects a set of communication systems to perform a communication group service for the particular communication group. The operator selection process and mechanism would involve the operator, possibly through the use of a standard mouse, keyboard and CRT, as is known in the art, selecting, based on a preestablished, trunking system configuration database, the set of communication systems and particular communication group needed to make the communication group service request. In the alternative, the set of communication systems for each communication group may be predetermined by a system manager and stored in the database of the central controller.

At step 201, the operator station would transmit a data packet containing the selected set of communication systems and the particular communication group to the central controller over a communication link, such as an ethernet link, to the central controller. At step 202, the central controller will, based on an established database and a set of search algorithms, determine, for each selected communication system, whether at least one communication unit of the particular communication group is registered in the communication system. The database that the central controller uses to make this determination would be composed of the communication groups present on the trunking system along with all of the communication units present on the trunking system.

The database maintains information that indicates which communication units are presently registered to which communication groups along with the communication system that each communication unit was registered in. This information allows the central controller to determine what communication units are present in a particular communication group along with the communication systems that have at least one communication unit of a communication group registered in it.

At step 202, based on the previously described central controller database, the central controller determines, for each selected communication system, whether at least one communication unit of the particular communication group is registered in the communication system. At step 203, if there are communication units in the particular communication group at all of the selected communication systems, processing will continue to step 204. At step 204, the request for communication group service will be granted by the central controller allocating resources at each selected communication system for the operator station. The central controller will issue a grant communication service data packet to the operator station over the communication link and the communication group service can now be performed. Also, the central controller will issue a grant communication data packet to the selected communication system's communication resource allocator which will issue a grant communication data packet, over the trunking control channel, to the communication units allowing the units to participate in the group communication service.

At step 203, if not all of the selected communication systems contain at least one communication unit for the particular communication group, the central controller will determine, at step 205, whether at least one of the selected communication systems has at least one communication unit in the particular communication group registered in it. If at least one of the selected communication systems has a communication unit in the particular group registered in it, processing would continue at step 206.

At step 206, the central controller allocates a communication resource for the operator station for each of the selected communication systems that have a communication unit for the particular communication group registered in it. The central controller will issue a grant communication service data packet to the operator station over the communication link and the communication group service can now be performed at the communication systems that have a communication resource allocated at it. Also, for these communication systems, the central controller will issue a grant communication data packet to the communication system's communication resource allocator which will issue a grant communication data packet, over the trunking control channel, to the communication units allowing the units to participate in the group communication service. The central controller also transmits, over the communication link, a service performance message to the operator station that indicates either: the selected communication systems that had at least one communication unit for the particular communication group registered in it; the selected communication systems that did not have a communication unit for the particular communication group registered in it; and the non selected communication systems that had at least one communication unit for the particular communication group registered in it. This information would inform the operator of the operator station that a portion of its selected communication systems for the particular communication group was not obtainable and that the operator has the option of requesting service on the non selected communication systems as provided by the central controller as shown in step 209.

If, at step 205, the central controller determines that there are no communication units for the particular communication group registered in any of the selected communication systems, processing will continue at step 208. At step 208, the central controller transmits a rejection message data packet, over the communication link, to the operator station indicating that the group communication service can not be performed because there are no communication units in the particular communication group registered in the selected communication systems. Also, the central controller obtains, from its database, the communication systems that have at least one communication unit of the particular communication group registered in it. From this database information, the central controller transmits a communication group/communication system message data packet, over the communication link, to the operator station which indicates the communication systems that have at least one communication unit for the particular communication group registered in it. The operator then has the option of requesting service on the non selected communication systems based on information provided by the central controller as shown in step 209.

This invention provides a trunking system operator the ability to communicate with a communication group only at a selected set of communication systems. Current trunked communication systems restrict the operator to communicating on all communication systems when a group communication service is requested. Therefore, communication resources are allocated at communication systems that were not necessarily needed for the communication service thereby reducing the efficiency and throughput of the trunked system. This invention allows the operator to communicate to only a select set of communication systems thereby using only the communication resources necessary to perform the communication system and allowing more throughput on the trunked communication system.

We claim:

1. In a network of communication systems that comprises a plurality of communication systems, a central controller that interfaces with the plurality of communication systems and at least one operator station, wherein each communication system includes a plurality of communication units that are arranged into communication groups, a limited number of communication resources that are transceived via a limited number of repeaters, and a communication resource allocator that allocates via the central controller the limited number of communication resources among the plurality of communication units, a method that allows the operator station to individually select communication systems for communication group services, the method comprises the steps of:

a) for a particular communication group, selecting, by the operator station, a communication group service for the particular communication group and selecting at least one communication system;

b) transmitting, by the operator station, the at least one selected communication system and an identification of the particular communication group to the central controller;

c) determining, by the central controller, whether at least one communication unit of the particular communication group is registered in the selected communication system; and d) when at least one communication unit of the particular communication group is registered in the selected communication system, assigning, by the central controller, a communication resource in the selected communication system to the operator station when a communication resource is available in the selected communication system, wherein the selected communication group service is performed.

2. The method of claim 1 further comprises, when there are no communication units of the particular communication group registered in the selected communication system, transmitting, by the central controller, a rejection message to the operator station indicating that there are no communication units of the particular communication group in the selected communication system and that the selected communication group service will not be performed.

3. The method of claim 2 further comprises transmitting, by the central controller, a communication group/communication system message to the operator station, wherein the communication group/communication system message indicates which communication systems have at least one communication unit of the particular communication group registered in it.

4. In the method of claim 1, step (a) further comprises selecting a set of communication systems.

5. The method of claim 4 further comprises, when at least one of the set of communication systems does not have a communication unit of the particular communication group registered in it, assigning, by the central controller on a per communication system basis, a communication resource in each of the other communication systems of the set of communication systems to the operator station when a communication resource is available, wherein the selected communication group service is performed in each of the other communication systems that had an available communication resource.

6. The method of claim 5 further comprises transmitting, by the central controller, a service performance message to the operator station, wherein the service performance message indicates that the at least one of the set of communication systems does not have a communication unit of the particular communication group registered in it.

7. In the method of claim 6, the transmitting the service performance message further comprises transmitting additional information that indicates which of the other communication systems the selected communication group service is performed in.

8. In the method of claim 1, the selecting of communication systems of step (a) further comprises accessing a database of predetermined communication system groupings for each communication group.

9. In a network of communication systems that comprises a plurality of communication systems, a central controller that interfaces with the plurality of communication systems and at least one operator station, wherein each communication system includes a plurality of communication units that are arranged into communication groups, a limited number of communication resources that are transceived via a limited number of repeaters, and a communication resource allocator that allocates via the central controller the limited number of communication resources among the plurality of communication units, a method for the at least one operation station to select individual communication systems for communication group services, the method comprises the steps of:

a) for a particular communication group, selecting, by the operator station, a communication group service for the particular communication group and selecting at least one communication system;

b) transmitting, by the operator station, the at least one selected communication system and an identification of the particular communication group to the central controller;

c) receiving a response to the transmission of the selected communication system; and d) when the response indicates that a communication resource has been granted, executing the selected communication group service.

10. The method of claim 9 further comprises, when the response indicates that there are no communication units of the particular communication group registered in the at least one selected communication system, receiving a list of each communication system that has at least one communication unit of the particular communication group registered in it.

11. The method of claim 9 further comprises, when a set of communication systems have been selected, receiving a list of each selected communication system of the set of communication systems that does not have at least one communication unit of the particular communication group registered in it and a list of each communication system of the set of communication systems that has at least one communication unit of the particular communication group registered in it.

12. In the method of claim 11, step (d) further comprises executing the selected communication group service only in the communication systems of the set of communication systems that have at least one communication unit of the particular communication group registered in it.

* * * * *